Patented Feb. 11, 1941

2,231,757

UNITED STATES PATENT OFFICE 2,231,757

PROCESS FOR RESOLVING PETROLEUM EMULSIONS

Melvin De Groote, University City, and Arthur F. Wirtel, Kirkwood, Mo., assignors to Petrolite Corporation, Ltd., Wilmington, Del., a corporation of Delaware No Drawing. Application October 23, 1939, Serial No. 300,847

4 Claims. (Cl. 252—340)

This invention relates primarily to the treatment of emulsions of mineral oil and water, such as petroleum emulsions, for the purpose of separating the oil from the water.

One object of our invention is to provide a novel process for resolving petroleum emulsions of the water-in-oil type, that are commonly referred to as "cut oil," "roily oil," "emulsified oil," etc., and which comprise fine droplets of naturally-occurring waters or brines dispersed in a more or less permanent state throughout the oil which constitutes the continuous phase of the emulsion, our process being particularly adapted to the resolution of crude oil emulsions of the kind obtained in connection with the treatment or the flooding of subterranean, oil-bearing strata by means of aqueous agents or the like.

Another object of our invention is to provide an economical and rapid process for separating emulsions which have been prepared under controlled conditions from mineral oils, such as crude petroleum and relatively soft waters or weak brines. Controlled emulsification and subsequent demulsification under the conditions just mentioned is of significant value in removing impurities, particularly inorganic salts, from pipeline oil.

Briefly stated, our process consists in subjecting a petroleum emulsion of the water-in-oil type to the action of a treating agent or demulsifying agent of the kind hereinafter described, thereby causing the emulsion to break down and separate into its component parts of oil and water or brine, when the emulsion is permitted to remain in a quiescent state after treatment or is subjected to other equivalent separatory procedures.

The new composition of matter that is used as the treating agent or demulsifying agent in our present process, consists of or comprises blown octadecadiene acid foots which may be employed in the acidic form, or in the form of a salt or ester. As is well known, octadecadiene acid is commonly referred to as 9,11-octadecadiene 1-acid and is usually obtained by subjecting ricinoleic acid to a temperature of approximately 290° to 315° C. The ricinoleic acid employed as a raw material in the manufacture of octadecadiene acid by any of the conventionally employed processes may be pure ricinoleic acid, or may be ricinoleic acid in admixture with other bodies occurring normally in association therewith, as, for instance, fatty acids obtained from castor oil and which are commonly known as castor oil fatty acids. Such castor oil fatty acids are conveniently obtained by the splitting of castor oil. Such splitting or saponification process can be conducted in any suitable manner, as, for example, by means of alkalies, the various Twitchell's reagents, or by means of a ferment or any suitable method. The technical product known as castor oil fatty acids may contain a certain amount of triricinolein, diricinolein, and monoricinolein. It is also possible that in the course of a splitting process the heat employed may result in the formation of certain polymolecular compounds obtained by the elimination of water. Thus, in the preparation of octadecadiene acid it is probable that as a general rule the ricinoleic acid or castor oil fatty acids employed does not contain more than approximately 80 to 90 percent of ricinoleic acid. Furthermore, it is sometimes feasible to heat castor oil at a temperature above 200° C., and even as high as that approximating or even above its pyrolytic point, that is, approximately 275° to 300° C., and thus obtain an at least partially dehydrated castor oil. Such partially dehydrated castor oil can then be saponified by any of the procedures above indicated, and the resultant acid can then be employed just as effectively as ricinoleic acid of the kind previously described. For purposes of convenience all these forms of castor oil fatty acid are included in the hereto appended claims within the term "ricinoleic acid."

Various methods and procedures are employed in the manufacture of octadecadiene acid from ricinoleic acid of the kind previously described. In all these methods the ricinoleic acid is heated to a temperature above its pyrolytic point, that is, somewhere above 270° to 275° C., and generally at a temperature not over 290° to 315° C. Having converted the ricinoleic acid by suitable pyrolytic methods in presence or absence of a catalyst into octadecadiene acid by elimination of approximately a molecule of water for each molecule of ricinoleic acid, the subsequent step involves the separation of the octadecadiene acid from the accompanying compounds. As a rule, this is purely a matter of distillation under vacuum and the condensation of the distillate. The temperature of distillation approximates the temperature of pyrolysis, and therefore, in most instances, the operations are conducted simultaneously, that is, the pyrolytic operation and the distillation are conducted at the same time. As to the manufacture of octadecadiene acid or the like, reference is made to U. S. Patent No. 2,156,737, dated May 2, 1939, to Priester, and also British Patent No. 306,452, dated May 9, 1930, to Schreiber.

Still residue or foots in such operating procedure results in a product, which, for want of a better name, is conveniently referred to as octadecadiene acid foots, and in the hereto appended claims the expression "octadecadiene acid foots" is used to refer to such product. When one compares the analysis of ricinoleic acid which has been subjected to pyrolytic treatment so as to yield a maximum amount of octadecadiene acid, along with the analysis of the octadecadiene acid and octadecadiene acid foots obtained therefrom, and makes allowances for the proportion of the foots to the acid, it becomes perfectly apparent that certain complex changes which are not understood take place when the octadecadiene acid is distilled off and the foots remain as a residuum. Depending on the purity of the fatty acids, and conditions of manufacture, the percentage of recovered foots may vary from five to thirty-five percent. As far as is known, no other similar product derived from castor oil has the same composition as that of such octadecadiene foots. This conclusion is based on the examination of the chemical and physical properties of such foots in comparison with similar products. For instance, a typical analysis on the foots in acidic form is as follows:

| | |
|---|---|
| Acid value | 75 to 80 |
| Saponification value | 210 to 230 |
| Hydroxyl value | 53 to 58 |
| Iodine value | 100 to 110 |
| Modified Reichert Meisel value | 20 to 23 |

After such acidic material is saponified and split back by means of hydrochloric acid, as is customary in the analytical procedures involving fatty material, one obtains an acidic value of approximately 200 to 210 and a hydroxyl value of approximately 55 to 60. Numerous other tests, such as reaction to sulfonating agents, etc., indicate that the material is different from various other fatty derivatives obtainable from ricinoleic acid or castor oil. The foregoing analysis is given by way of illustration only and is not intended to limit the metes and bounds of the composition of the octadecadiene acid foots herein contemplated after gaseous oxidation as a demulsifying agent. Insofar that the exact composition of such foots is not known, it appears that the only suitable description is dependent on terms involving the method of manufacture. For this reason attention is directed to the fact that in the hereto appended claims such procedure is employed for the simple reason that no other suitable method of description appears available.

Broadly speaking, then, the manufacture of octadecadiene acid from ricinoleic acid, and more particularly from castor oil fatty acid, is dependent upon a pyrolytic process which involves a temperature above the conversion point, insofar that the ricinoleic acid is changed or converted into octadecadiene acid. As has been previously indicated, such temperature, that is, the temperature of chemical change or transformation, is indicated as a temperature above the pyrolytic point. Similarly, although 290° to 315° C. is ordinarily the upper range for such reaction, it is possible that in some instances it is desirable to employ a somewhat higher temperature, for instance, possibly 320° to 335° C., or thereabouts. There is no objection to a higher temperature provided that one does not obtain undue decomposition of the octadecadiene acid, and hence, briefly such higher temperatures may be indicated as being below the point of decomposition. In the hereto appended claims the word "decomposition" is intended to refer to the decomposition of octadecadiene acid, and the broadest range of conversion thus can be indicated as a temperature above the pyrolytic point and below the point of decomposition. It has been pointed out that numerous variables enter into the conditions surrounding the manufacture of octadecadiene acid. They include, among others, the following: The nature of the raw material being converted; the size of the batch; the presence or absence of a catalyst; the rate of heating; the rate of removal in respect to octadecadiene acid; the nature of the container, whether iron or some other metal; the possibility of overheating; whether or not agitation is employed during the process, etc. It is not intended that the process of producing octadecadiene acid shall be limited to any specific set of conditions.

We have found that if octadecadiene acid foots of the kind described is subjected to a blowing operation of the kind commonly employed to produce blown oils or blown fatty acids from unsaturated oils or fatty acids, as in the manufacture of blown castor oil, blown castor oil fatty acids, blown soya bean oil, or the like, that one obtains a new composition or compound which is more valuable as a demulsifier in many instances than the unoxidized octadecadiene acid foots and may find utility in other arts. The method or process for producing such oxidized or blown octadecadiene acid foots is the conventional process, as has been previously indicated. Such process is normally applied to various oils or fatty acids of the unsaturated non-drying type, and particularly to such individual oils as castor oil, rape seed oil, soya bean oil, etc. Oxidation is usually conducted by means of air which may be dried or moist. Oxygen, ozone or ozonized air may be employed, but purely as a matter of economy, ordinary air, without any previous dehydration, is usually employed. One may add a catalyst, if desired, and such catalyst may represent a metallic salt, such as manganese oleate, cobalt oleate, or the like, or it may represent an organic type of material which tends to form peroxides, such as alpha pinene, linseed oil, etc. The temperature of oxidation may be any suitable temperature at or slightly above the boiling point of water up to and below the decomposition point of the fatty material being oxidized. If desired, oxidation may take place at atmospheric pressures or at higher pressures. Our preference is to oxidize octadecadiene acid foots at slightly above the boiling point of water, for instance, a temperature of 120° C., and without the use of a catalyst, and by continued oxidation with ordinary air without previous dehydration for a period of time approximating seven to twelve days. The time required varies somewhat with the size of the batch. In the case of small batches it is preferable to employ oxidation under pressure. In such instances a pressure varying from 75 pounds to 125 pounds gauge pressure is entirely satisfactory. An apparatus of the kind ordinarily employed for the oxidation of castor oil, soya bean oil, and the like, may be employed. During such oxidation, in addition to a change in chemical characteristics, there is of course a change in viscosity, color, solubility in various solvents, etc.

Even if one starts with a material whose composition is definitely known, for instance, pure triricinolein, it is impossible to indicate the various changes which take place in the course of the blowing or oxidation step. For that matter, it well may be that various reactions take place and that, depending upon circumstances, possibly conditions of oxidation or blowing, one set of reactions may take place to a greater degree or to a lesser degree than some other particular reaction or reactions. See "Chemistry of the Oil Industry," by Southcombe (1926), page 181, and "Synthetic Organic Chemicals," volume 8, No. 1, page 3.

Recognizing the fact that the exact composition or even the approximate composition of octadecadiene acid foots is not known, and furthermore, recognizing the fact that even when a product of known composition is oxidized or blown, one cannot clearly indicate the composition of the resulting product, it becomes obvious that in order to describe the new composition of matter herein contemplated, particularly for use as a demulsifying agent, one must resort to nomenclature hich defines the product in terms of its method of manufacture, as has been previously suggested in regard to the foots also.

In the hereto appended claims, the word "blown" is employed in the same sense that the word "blown" is ordinarily used in connection with blown castor oil or the like. It means the product obtained by drastic gaseous oxidation of such a character as to definitely change the character and composition of the product being submitted to such oxidation step. Our preferred reagent is obtained from octadecadiene acid foots of the kind indicated by the preceding analysis by submitting it to the low temperature, long time oxidation procedure previously described, and without the use of superatmospheric pressure, and preferably without the presence of a catalyst. In such operation, as previously stated, ordinary air without previous dehydration is employed, although it may be conveniently heated to a temperature approximating that employed during the oxidation step. Such oxidized octadecadiene acid foots is generally acidic in nature and it may be employed in such acidic form, or if desired, it may be neutralized by means of caustic soda, caustic potash, ammonia, calcium oxide, triethanolamine, diethanolamine, or some other suitable alkali or monoamine. Similarly, such acidic property can be eliminated by esterification with a monohydric alcohol, such as ethyl alcohol, propyl alcohol, octyl alcohol, or with a polyhydric alcohol, such as ethylene glycol, glycerol, etc. Furthermore, one can eliminate such acidity by employing hydroxylated amines, such as monoethanolamine, diethanolamine, and triethanolamine, as esterifying agents, that is, in such a manner that they act as alcohols.

As an example of the character of the blown octadecadiene acid foots, reference is made to the following values, which are typical for a bloom octadecadiene acid foots derived from raw material of the kind indicated by the preceding analytical table:

| | |
|---|---|
| Acid value | 60–70 |
| Saponification value | 255–265 |
| Hydroxyl value | 5–15 |
| Iodine value | 64–70 |
| Modified Reichert Meisel value | 20–23 |

Attention is directed to the fact that the above values must be considered as approximations only. The peculiar character of the material does not make it as susceptible to ordinary analytical procedures as is true of most fatty materials. For instance, the material is somewhat insoluble in the solvents ordinarily used in the iodine and saponification value determinations. Such insolubility may have a marked effect on the values obtained. This applies also to the hydroxyl values obtained. In the hereto appended claims reference to neutralization or esterification, that is, reference to non-acidic forms, is eliminated purely as a matter of convenience and for purposes of brevity. It is understood that such claims are not limited to the acidic form of the blown octadecadiene acid foots and are intended to include the optional auxiliary step of neutralization or esterification, even though specific reference is not included in said claims, except where an expressed limitation is included.

In the hereto appended claims, the expression "blown octadecadiene acid foots" is used in the generic sense to include all such forms, whether neutralized or not, and whether esterified or not. When it is intended to refer to the blown octadecadiene acid foots without esterification and without neutralization, such material will be referred to as "blown octadecadiene acid foots in acidic form."

Blown octadecadiene acid foots are available at a price, in many instances, in the neighborhood of one-half or one-third of the cost of blown castor oil or blown castor oil fatty acids. For this reason it presents a particularly attractive demulsifier, notwithstanding the fact that in numerous instances it may not resolve a petroleum emulsion in a greater ratio or more rapidly than will some other available demulsifier, but invariably it is available at only a fraction of the cost of such other more commonly used demulsifier, particularly if such demulsifier happens to be of the blown castor oil type.

The conventional demulsifying agents employed in the treatment of oil field emulsions are commonly used as such, or after dilution with any suitable solvent, such as water, petroleum hydrocarbons, including gasoline, kerosene, stove oil; a coal tar product, such as benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, hexyl alcohol, octyl alcohol, may be employed as diluents. Miscellaneous solvents, such as pine oil, carbon tetrachloride, sulfur dioxide extract obtained in the refining of petroleum, etc., may be employed as diluents. Similarly, the material or materials employed as the demulsifying agent of our process may be admixed with one or more of the solvents customarily used in connection with conventional demulsifying agents. Moreover, said material or materials may be used alone or in admixture with other suitable well known classes of demulsifying agents, such as demulsifying agents of the modified fatty acid type, the petroleum sulfonate type, the alkylated sulfoaromatic type, etc.

It is known that conventional demulsifying agents may be used in a water-soluble form or an oil-soluble form, or in a form exhibiting both oil and water solubility. Sometimes they are used in a form which exhibits relatively limited water solubility and relatively limited oil solubility. However, since such reagents are sometimes used in a ratio of 1 to 10,000 or 1 to 20,000, or even 1 to 30,000, such an apparent insolubility in oil and water is not significant, because said reagents undoubtedly have solubility within the concentration employed. The same fact is true in regard to the material or materials employed as the demulsifying agent in our process.

We desire to point out that the superiority of the reagent or demulsifying agent contemplated in our process is based upon its ability to treat certain emulsions at a somewhat lower cost than is possible with other available demulsifiers, or the conventional mixtures thereof. It is believed that the particular demulsifying agent or treating agent herein described will find comparatively limited application, as far as the majority of oil field emulsions are concerned; but we have found that such demulsifying agent has commercial value, as it will economically break or resolve oil field emulsions in a number of cases at a cost which is lower than that possible with the conventional demulsifying agents heretofore available.

In practising our process, a treating agent or demulsifying agent of the kind described above may be brought in contact with the emulsion to be treated in any of the numerous ways now employed in the treatment of petroleum emulsions of the water-in-oil type with chemical demulsifying agents, such, for example, as by introducing the treating agent into the well in which the emulsion is produced; introducing the treating agent into a conduit through which the emulsion is flowing; introducing the treating agent into a tank in which the emulsion is stored; or introducing the treating agent into a container that holds a sludge obtained from the bottom of an oil storage tank. In some instances, it may be advisable to introduce the treating agent into a producing well in such a way that it will become mixed with water and oil that are emerging from the surrounding strata, before said water and oil enter the barrel of the well pump or the tubing up through which said water and oil flow to the surface of the ground. After treatment, the emulsion is allowed to stand in a quiescent state, usually in a settling tank, and usually at a temperature varying from atmospheric temperature to about 200° F., so as to permit the water or brine to separate from the oil, it being preferable to keep the temperature low enough to prevent the volatilization of valuable constituents of the oil. If desired, the treated emulsion may be acted upon by one or more of the various kinds of apparatus now used in the operation of breaking petroleum emulsions, such as homogenizers, hay tanks, gun barrels, filters, centrifuges, or electrical dehydrators.

The amount of treating agent that may be required to break the emulsion may vary from approximately one part of treating agent to 500 parts of emulsion, up to one part of treating agent to 20,000 or even 30,000 parts of emulsion. The proportion depends on the type of emulsion being treated, and also upon the equipment being used, and the temperature employed. In treating exceptionally refractory emulsions of the kinds known as "tank bottoms" and "residual pit oils," the ratio of 1:500, above referred to, may be required. In treating fresh emulsion, i. e., emulsions that will yield readily to the action of chemical demulsifying agents, the ratio of 1:30,000 above referred to may be sufficient to produce highly satisfactory results. In general, we have found that for an average petroleum emulsion a ratio of 1 part of treating agent to 5,000 or 10,000 parts of emulsion will usually be found to produce commercially satisfactory results.

Having thus described our invention, what we claim as new and desire to secure by Letters Patent is:

1. A process for breaking petroleum emulsions of the water-in-oil type, which consists in subjecting the emulsion to the action of a demulsifying agent, comprising blown octadecadiene acid foots derived by the process of preparing 9,11-octadecadiene 1-acid by subjecting ricinoleic acid to a temperature above its pyrolytic point and below 315° C., followed by removal of said octadecadiene acid by vacuum distillation, with subsequent drastic gaseous oxidation of the residuum by a conventional blowing process.

2. A process for breaking petroluem emulsions of the water-in-oil type, which consists in subjecting the emulsion to the action of a demulsifying agent, comprising blown octadecadiene acid foots in acidic form, derived by the process of preparing 9,11-octadecadiene 1-acid by subjecting ricinoleic acid to a temperature above its pyrolytic point and below 315° C., followed by removal of said octadecadiene acid by vacuum distillation, with subsequent drastic gaseous oxidation of the residuum by a conventional blowing process.

3. A process for breaking petroleum emulsions of the water-in-oil type, which consists in subjecting the emulsion to the action of a demulsifying agent, comprising blown octadecadiene acid foots in acidic form, derived by the process of preparing 9,11-octadecadiene 1-acid by subjecting castor oil fatty acid to a temperature above its pyrolytic point and below 315° C., followed by removal of said octadecadiene acid by vacuum distillation, with subsequent drastic gaseous oxidation of the residuum by a conventional blowing process.

4. A process for breaking petroleum emulsions of the water-in-oil type, which consists in subjecting the emulsion to the action of a demulsifying agent, comprising blown octadecadiene acid foots in acidic form, admixed with a suitable solvent; said blown octadecadiene acid foots being derived by the process of preparing 9,11-octadecadiene 1-acid by subjecting castor oil fatty acid to a temperature above its pyrolytic point and below 315° C., followed by removal of said octadecadiene acid by vacuum distillation, with subsequent drastic gaseous oxidation of the residuum by a conventional blowing process.

MELVIN DE GROOTE.
ARTHUR F. WIRTEL.